United States Patent
Hu

(10) Patent No.: US 9,244,858 B1
(45) Date of Patent: Jan. 26, 2016

(54) SYSTEM AND METHOD OF SEPARATING READ INTENSIVE ADDRESSES FROM NON-READ INTENSIVE ADDRESSES

(71) Applicant: SANDISK TECHNOLOGIES INC., Plano, TX (US)

(72) Inventor: Xinde Hu, San Diego, CA (US)

(73) Assignee: SANDISK TECHNOLOGIES INC., Plano, TX (US)

( * ) Notice: Subject to any disclaimer, the term of this patent is extended or adjusted under 35 U.S.C. 154(b) by 26 days.

(21) Appl. No.: 14/468,052

(22) Filed: Aug. 25, 2014

(51) Int. Cl.
*G06F 12/02* (2006.01)
*G06F 12/10* (2006.01)
*G06F 3/06* (2006.01)

(52) U.S. Cl.
CPC .......... *G06F 12/1072* (2013.01); *G06F 3/0619* (2013.01); *G06F 3/0644* (2013.01); *G06F 3/0658* (2013.01); *G06F 3/0688* (2013.01); *G06F 2212/1032* (2013.01); *G06F 2212/152* (2013.01); *G06F 2212/2022* (2013.01); *G06F 2212/261* (2013.01); *G06F 2212/7201* (2013.01)

(58) Field of Classification Search
CPC . G06F 12/1072; G06F 3/0619; G06F 3/0658; G06F 3/0688
USPC .......................... 711/103, 154, 156, 158, 202; 365/185.33
See application file for complete search history.

(56) References Cited

U.S. PATENT DOCUMENTS

| | | | |
|---|---|---|---|
| 7,177,977 B2 | 2/2007 | Chen et al. | |
| 7,262,994 B2 | 8/2007 | Fong et al. | |
| 7,401,196 B2 * | 7/2008 | Mori | G06F 3/0619 707/999.008 |
| 7,818,489 B2 * | 10/2010 | Karamcheti | G06F 9/5016 711/101 |
| 7,818,525 B1 * | 10/2010 | Frost | G06F 12/0246 365/185.25 |
| 7,876,620 B2 | 1/2011 | Mokhlesi et al. | |
| 8,074,011 B2 * | 12/2011 | Flynn | G06F 9/52 711/103 |
| 8,156,302 B2 * | 4/2012 | Karamcheti | G06F 9/5016 711/103 |
| 8,189,379 B2 * | 5/2012 | Camp | G11C 16/3418 365/185.02 |
| 8,190,842 B2 * | 5/2012 | Frost | G06F 12/0246 365/185.25 |
| 8,307,151 B1 * | 11/2012 | Caraccio | G06F 12/0223 711/103 |
| 8,380,915 B2 * | 2/2013 | Wood | G11C 16/28 711/100 |
| 8,555,024 B2 * | 10/2013 | Karamcheti | G06F 9/5016 711/101 |
| 8,706,957 B2 * | 4/2014 | Caraccio | G06F 12/0223 711/103 |
| 8,719,501 B2 * | 5/2014 | Flynn | G06F 12/0246 711/103 |
| 8,730,721 B2 * | 5/2014 | Camp | G11C 16/3418 365/185.02 |
| 8,943,263 B2 * | 1/2015 | Frost | G06F 12/0246 711/103 |
| 9,007,825 B2 * | 4/2015 | Camp | G11C 16/3418 365/185.02 |
| 9,063,663 B2 * | 6/2015 | Suzuki | G06F 3/0608 |
| 2009/0125671 A1 * | 5/2009 | Flynn | G06F 9/52 711/103 |
| 2011/0038203 A1 * | 2/2011 | Camp | G11C 16/3418 365/185.02 |
| 2011/0040932 A1 * | 2/2011 | Frost | G06F 12/0246 711/103 |
| 2012/0233391 A1 * | 9/2012 | Frost | G06F 12/0246 711/103 |

(Continued)

*Primary Examiner* — Stephen Elmore
(74) *Attorney, Agent, or Firm* — Toler Law Group, PC

(57) ABSTRACT

A data storage device includes a memory including a first set of storage elements corresponding to a first set of physical addresses and a second set of storage elements corresponding to a second set of physical addresses, where the first set of storage elements is distinct from the second set of storage elements. The data storage device also includes a controller coupled to the memory. The controller is configured to map logical addresses to physical addresses of the memory. The controller is configured to assign read intensive logical addresses to the second set of physical addresses and to assign non-read intensive logical addresses to the first set of physical addresses.

20 Claims, 5 Drawing Sheets

(56) References Cited

U.S. PATENT DOCUMENTS

| | | | | |
|---|---|---|---|---|
| 2012/0236639 A1* | 9/2012 | Camp | ................ | G11C 16/3418 365/185.02 |
| 2013/0019058 A1* | 1/2013 | Caraccio | ............. | G06F 12/0223 711/103 |
| 2013/0166855 A1* | 6/2013 | Batwara | ................ | G06F 3/0608 711/154 |
| 2014/0223087 A1* | 8/2014 | Caraccio | ............. | G06F 12/0223 711/103 |
| 2014/0301140 A1* | 10/2014 | Camp | ................ | G11C 16/3418 365/185.02 |
| 2015/0268871 A1* | 9/2015 | Shu | ....................... | G06F 3/0616 711/103 |

* cited by examiner

_US 9,244,858 B1_

SYSTEM AND METHOD OF SEPARATING READ INTENSIVE ADDRESSES FROM NON-READ INTENSIVE ADDRESSES

FIELD OF THE DISCLOSURE

The present disclosure is generally related to reading data from a memory device.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

Errors can occur in data written to a memory of a non-volatile data storage device, leading to data loss or delays due to data recovery processes. For example, flash memory can be subject to read disturb effects. Read disturb occurs when reading a first memory cell causes a change in a state of a second cell, such as a neighboring cell. Read disturb effects can be cumulative. Thus, a memory cell that is adjacent to a frequently read memory cell may be subject to greater read disturb effects (e.g., increased likelihood of errors) than a memory cell that is not adjacent to a frequently read memory cell.

SUMMARY

Techniques are disclosed for storing data associated with non-read intensive logical addresses at a portion of a memory that is distinct from a portion of the memory that stores data associated with read intensive logical addresses. Additionally or in the alternative, different write operations may be used for the portion of the memory that stores data associated with non-read intensive logical addresses and the portion of the memory that stores data associated with read intensive logical addresses. Further, different read operations may be used for the portion of the memory that stores data associated with non-read intensive logical addresses and the portion of the memory that stores data associated with read intensive logical addresses. Accordingly, read disturb effects associated with the read intensive logical addresses can be isolated from the non-read intensive logical addresses, and read disturb effects associated with the read intensive logical addresses can be mitigated or reduced.

DETAILED DESCRIPTION

Particular embodiments of the present disclosure are described below with reference to the drawings. In the description, common features are designated by common reference numbers throughout the drawings.

Figure 1:
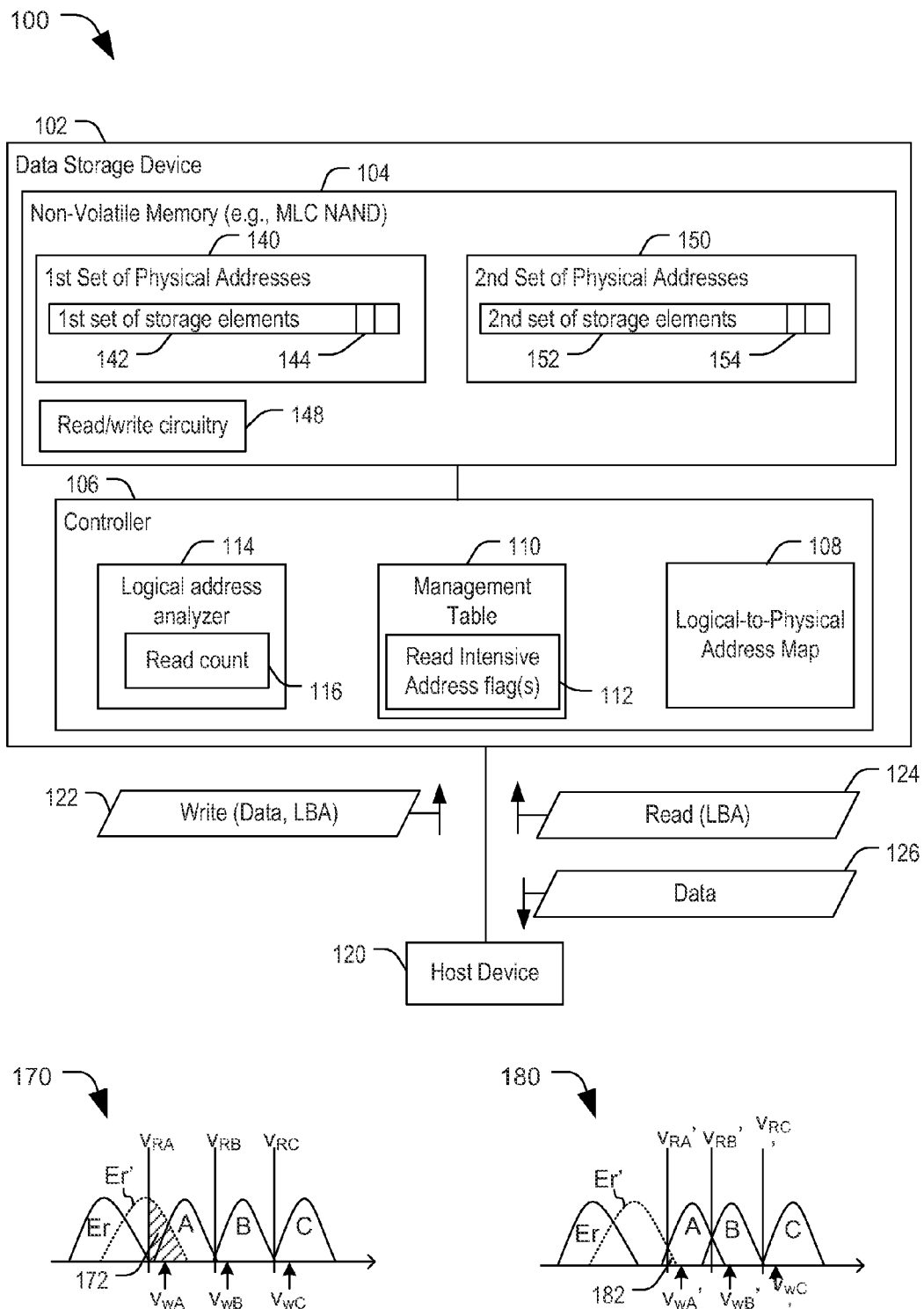
FIG. 1 is a block diagram of a particular illustrative embodiment of a system, including a data storage device that includes a controller configured to store data corresponding to read intensive logical addresses to a first set of storage elements and to store data corresponding to non-read intensive logical addresses to a second set of storage elements.

FIG. 1 is a block diagram of a particular illustrative embodiment of a system 100 including a data storage device 102 coupled to an accessing device, such as a host device 120. The data storage device 102 may be coupled to the host device 120 via a communication path, such as a wired communication path and/or a wireless communication path. The data storage device 102 may be embedded within the host device 120, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (i.e., "removably" coupled to) the host device 120. For example, the data storage device 102 may be removably coupled to the host device 120 in accordance with a removable universal serial bus (USB) configuration. In some embodiments, the data storage device 102 may include or correspond to a solid state drive (SSD), which may be used as an embedded storage drive, an enterprise storage drive (ESD), or a cloud storage drive (CSD), as illustrative, non-limiting examples.

The data storage device 102 includes a controller 106 coupled to a memory 104, such as a non-volatile memory. The controller 106 may be coupled to the memory 104 via a bus, an interface, another structure, or a combination thereof. The memory 104 may include a two dimensional memory configuration or a three dimensional (3D) memory configuration. The memory 104 may store data, such as user data or representations thereof.

The memory 104 may be included on one or more memory dies that are separate from the controller 106 and coupled to the controller 106 (e.g., via a bus). In other implementations, the memory 104 and the controller 106 may be included on a common die. The memory 104 may include multiple sets of storage elements. For example, each set of storage elements may correspond to a block. To illustrate, a first set of storage elements 142, including a first particular storage element 144, may be addressed by or correspond to a first set of physical addresses 140 of a first block. Similarly, a second set of storage elements 152, including a second particular storage element 154, may be addressed by or correspond to a second set of physical addresses 150 of a second block. Each storage element (e.g., memory cell or bit cell) of the memory 104 may be configured to store one or more data values (e.g., a bit value), such as "1" or "0." For example, each storage element may be programmable as a single-level cell (SLC) (e.g., a single bit per storage element) or a multi-level cell (MLC) (e.g., multiple bits per storage element).

The memory 104 may further include read/write circuitry 148. The read/write circuitry 148 may be configured to enable a read operation to read data from the storage elements of the memory 104 and may be configured to enable write operations to write data to the storage elements of the memory 104. In some implementations, read circuitry and write circuitry may be separate components of the memory 104.

The host device 120 may include a processor and a memory. The memory may be configured to store data and/or instructions that may be executable by the processor. The memory may be a single memory or may include one or more memories, such as one or more non-volatile memories, one or more volatile memories, or a combination thereof.

The host device 120 may issue one or more commands to the data storage device 102, such as one or more requests to read data from or write data to the memory 104 of the data storage device 102. For example, the host device 120 may send a write command 122 that identifies a particular logical address (e.g., a logical block address (LBA)) and indicates data to be written to the particular logical address. The data may be included with the write command 122 or may be provided to the data storage device 102 by the host device 120 after the write command 122 is sent. After the data is received by the controller 106 from the host device 120, the data may be processed by the controller 106. To illustrate, the data may be encoded using an ECC engine (not shown) to form an ECC codeword. For example, the ECC engine may include an encoder configured to encode the data using an ECC encoding technique. The ECC engine may include a Reed-Solomon encoder, a Bose-Chaudhuri-Hocquenghem (BCH) encoder, a low-density parity check (LDPC) encoder, a turbo encoder, a turbo product encoder, an encoder configured to encode the data according to one or more other ECC techniques, or a combination thereof, as illustrative, non-limiting examples. The ECC codeword may be stored at one or more storage elements of the memory 104 that are mapped to the particular logical address.

In another example, the host device 120 may send a read command 124 that identifies a particular logical address (e.g., a LBA). Responsive to the read command 124, the data storage device 102 may read data (e.g., an ECC codeword) from one or more storage elements of the memory 104 that are mapped to the particular logical address. The data read from the one or more storage elements may be processed by the data storage device (e.g., decoded using the ECC engine) and provided to the host device 120 as data 126.

In a particular embodiment, the memory 104 is a flash memory (e.g., a NAND flash memory). In this embodiment, a value stored at a particular storage element, such as the first particular storage element 144, may be sensed by applying a read voltage to the particular storage element. The particular storage element is activated if the read voltage satisfies (e.g., exceeds) a threshold voltage of the particular storage element. The threshold voltage depends on a value stored in the particular storage element. Graph 170 illustrates a read voltage distribution of a set of storage elements (e.g., the first set of storage elements 142) that are configured to operate as a 2-bit MLC memory. As illustrated in the graph 170, a first state (e.g., an "Er" state) and a second state (e.g., an "A" state) may be distinguished based on a first read voltage, $V_{RA}$ (e.g., a lowest read voltage), the second state (e.g., the A state) and a third state (e.g., a "B" state) may be distinguished based on a second read voltage, $V_{RB}$ (e.g., a next lowest read voltage), and the third state (e.g., the B state) and a fourth state (e.g., a "C" state) may be distinguished based on a third read voltage, $V_{RC}$ (e.g., a highest read voltage). Although the graph 170 corresponds to a 2-bit MLC memory, a similar read voltage distribution would apply to a SLC memory (although only two states, such as an Er state and an A state would be used). Likewise, a similar read voltage distribution applies to MLC memory storing more than 2 bits (although a different number of states are used based on the number of bits).

The graph 170 also illustrates an Er' state. The Er' state corresponds to a shift, as a result of read disturb, of the threshold voltage associated with storage elements in the Er state. Thus, read disturb effects can shift the read voltage distribution associated with the first state (e.g., the Er state) such that distinguishing the first state from the second state (e.g., the A state) is more difficult. To illustrate, a region 172 of the graph 170 indicates storage elements with the Er state that have shifted sufficiently that they will be misread as having the A state based on the read voltage $V_{RA}$. Since read disturb effects can be cumulative, the more often a particular storage element (or a set of storage elements, such as a wordline) is read, the more likely read disturb effects will cause errors in data associated with storage elements adjacent to the particular storage element (e.g., storage elements of an adjacent wordline). To illustrate, if the first set of storage elements 142 corresponds to a particular wordline, each read of the particular wordline may result in a small change in the charge stored at one or more storage elements (e.g., in a floating gate) of a wordline that is adjacent to the first set of storage elements 142. Eventually, the small changes in the charge in the storage elements of the adjacent wordline may result in data errors.

How frequently a wordline (or a particular set of storage elements) is read depends on the particular data that is stored at the wordline and how frequently that data is accessed by the host device 120. For example, certain data (such as system data, operating system data, etc.) may be accessed by the host device 120 more frequently than other data. In the embodiment illustrated in FIG. 1, the host device 120 issues read commands, such as the read command 124, that are associated with logical addresses. The controller 106 maintains a logical-to-physical address map 108 which maps logical addresses received from the host device 120 to physical addresses of the memory 104.

To mitigate or reduce read disturb effects, the controller 106 may be configured to identify "read intensive" logical addresses. A read intensive logical address is a logical address of data that is read more frequently by the host device 120 than data of other logical addresses. For example, a read intensive logical address may correspond to data that is read more frequently than an average read frequency of data stored at the data storage device 102.

Although read frequency is described above to illustrate the concept of read intensive logical addresses, read intensive logical addresses may be distinguished from non-read intensive logical addresses based on other criteria. For example, a count of read commands or read operations that are associated with various logical addresses may be used to distinguish read intensive and non-read intensive logical addresses. In this example, as illustrated in FIG. 1, a logical address analyzer 114 of the controller 106 (or of the host device 120) may maintain a read count 116 associated with each logical block address (LBA) of data stored at the memory 104. The read count 116 of a particular LBA, such as an LBA of data stored in the first particular storage element 144, may be compared to a threshold. If the read count 116 satisfies (e.g., is greater than or equal to) the threshold, a logical address (e.g., the particular LBA) mapped to the particular storage element may be flagged as a read intensive logical address. In another example, the host device 120 may indicate to the data storage device 102 (e.g., via a message provided to the controller 106 or a flag associated with the particular LBA) that particular data or particular LBAs of data will be read frequently (e.g., based on the nature of the data).

The controller 106 may maintain a management table 110 that includes data identifying which logical addresses are read intensive logical addresses. For example, the management table 110 may include read intensive address flags 112 to identify logical addresses that are deemed read intensive. In an alternate configuration, the management table 110 may also, or in the alternative, include non-read intensive address flags (not shown) to identify logical addresses that are determined to not be read intensive. In the alternate configuration, logical addresses that are not associated with a non-read intensive address flag are considered to be read intensive. Although the management table 110 and the logical-to-physical address map 108 are illustrated separately in FIG. 1, in some configurations, the management table 110 and the logical-to-physical address map 108 may be integrated together. For example, the read intensive address flags 112 may be stored as entries in the logical-to-physical address map 108. In another example, the read intensive address flags 112 may be stored as a bit corresponding to each entry in the logical-to-physical address map 108 indicating whether the entry corresponds to read intensive data or non-read intensive data.

The controller 106 may be configured to assign read intensive logical addresses and non-read intensive logical addresses to different portions of the memory 104. For example, the non-read intensive logical addresses may be assigned to the first set of physical addresses 140 (corresponding to or including the first set of storage elements 142) by default, and the read intensive logical addresses may be assigned to the second set of physical addresses 150 (corresponding to or including the second set of storage elements 152) after the read intensive logical addresses are identified. In a particular embodiment, the different portions of the memory 104 may be non-adjacent. To illustrate, when the first set of storage elements 142 is a first wordline and the second set of storage elements 152 is a second wordline, the first wordline may not be adjacent to the second wordline. For example, non-adjacent wordlines may correspond to or be included within different blocks. In a 3D memory configuration, the different blocks may be associated with different horizontal or vertical levels of the memory 104.

The controller 106 may also be configured to cause the read/write circuitry 148 to use a first set of write voltages to write data to storage elements associated with non-read intensive logical addresses (e.g., the first set of storage elements 142) and to use a second set of write voltages to write data to storage elements associated with read intensive logical addresses (e.g., the second set of storage elements 152). Similarly, the controller 106 may be configured to cause the read/write circuitry 148 to use a first set of read voltages to read data from the storage elements associated with the non-read intensive logical addresses (e.g., the first set of storage elements 142) and to use a second set of read voltages to read data from the storage elements associated with the read intensive logical addresses (e.g., the second set of storage elements 152). For example, in the graph 170, boundary voltages between states of the first distribution of read voltages may be used to read data from the storage elements associated with the non-read intensive logical addresses (e.g., the first set of storage elements 142). Thus, the first set of read voltages may correspond to $V_{RA}$, $V_{RB}$, and $V_{RC}$ in the graph 170.

A graph 180 illustrates a second distribution of read voltages associated with read intensive logical addresses. The second distribution of read voltages may result from programming storage elements corresponding to the read intensive logical addresses using a second write mode, which is different than a first write mode used to program storage elements represented in the graph 170, as explained further below. The graph 180 includes the first state (e.g., the Er state), the second state (e.g., the A state), the third state (e.g., the B state) and the fourth state (e.g., the C state). The first state (e.g., the Er state) may be distinguished from the second state (e.g., the A state) using a first read voltage, $V_{RA}'$ (e.g., a lowest read voltage). The second state (e.g., the A state) may be distinguished from the third state (e.g., the B state) using a second read voltage, $V_{RB}'$ (e.g., a next lowest read voltage).

The third state (e.g., the B state) may be distinguished from the fourth state (e.g., the C state) using a third read voltage, $V_{RC}'$ (e.g., a highest read voltage). The graph 180 also illustrates the Er' state corresponding to the shift, as a result of read disturb, of the threshold voltage associated with storage elements in the Er state. In the graph 180, a read voltage distribution associated with the A state is shifted away from a read voltage distribution associated with the Er state. For example, in the graph 180, a difference between the lowest read voltage, $V_{RA}'$ (e.g., a boundary between the Er state and the A state) and the next lowest read voltage, $V_{RB}'$ (e.g., a boundary between the A state and the B state) may be smaller than the corresponding difference (e.g., between $V_{RA}$ and $V_{RB}$) in the graph 170. Thus, a region 182 indicating shifted storage elements having the Er state that will be misread using the read voltage $V_{RA}'$ is smaller than the corresponding region 172 of the graph 170. Accordingly, by using read voltages corresponding to the boundaries between states of the graph 180, read disturb effects may generate fewer data errors associated with distinguishing the Er state and the A state.

The read voltage distribution associated with the A state may be shifted away from a read voltage distribution associated with the Er state by changing a write operation performed to program a storage element to the A state. For example, in the graph 170, a storage element may be programmed to the A state by increasing charge storage at the storage element (e.g., by applying programming voltage pulses) until a voltage across the storage element is greater than or equal to a first write voltage, $V_{WA}$ (e.g. a lowest write voltage). Similarly, the storage element may be programmed to the B state by increasing charge storage at the storage element until the voltage across the storage element is greater than or equal to a second write voltage, $V_{WB}$ (e.g. a next lowest write voltage), and the storage element may be programmed to the C state by increasing charge storage at the storage element until the voltage across the storage element is greater than or equal to a third write voltage, $V_{WC}$ (e.g. a highest write voltage). To shift the voltage distribution of the A state (as in the graph 180), the voltage distribution of the A state may be narrowed, narrowed and shifted, or just shifted. For example, in the graph 180, a storage element may be programmed to the A state by increasing charge storage at the storage element (e.g., by applying programming voltage pulses) until a voltage across the storage element is greater than or equal to a first write voltage, $V_{WA}'$ (e.g. a lowest write voltage). In this example, the write voltage $V_{WA}$ may be less than the write voltage $V_{WA}'$. In another example, programming voltage pulses used to program a storage element to the A state may be finely controlled (e.g., smaller pulses) such that the voltage distribution of storage elements in the A state is narrower in the graph 180 than in the graph 170. In this example, the write voltage $V_{WA}$ may be less than the write voltage $V_{WA}'$ or the write voltage $V_{WA}$ may be substantially equal to the write voltage $V_{WA}'$.

Additionally, physical addresses that are mapped to read intensive logical addresses may be co-located (e.g., at the second set of physical addresses 150, which may correspond to one or more dedicated blocks of the memory 104). Co-locating the physical addresses mapped to read intensive logical addresses may reduce the effects of read disturb on the non-read intensive logical addresses (e.g., by isolating or separating the non-read intensive logical addresses from the read intensive logical addresses). For example, when the first set of physical addresses 140 is mapped to the non-read intensive logical addresses and the second set of physical addresses 150 is mapped to the read intensive logical addresses, the first set of storage elements 142 does not neighbor (e.g., is not adjacent to) the second set of storage elements 152. Thus, frequent reading of data stored at the second set of physical addresses 150 does not cause read disturb that significantly affects data stored at the first set of physical addresses 140.

During operation, the host device 120 may send one or more write commands, such as the write command 122, to the data storage device 102. Each write command may be associated with a logical address and data. The controller 106 may use the logical-to-physical address map 108 to identify a physical address or physical addresses that correspond to the logical address. For example, the logical address may be mapped to a physical address associated with the first set of physical addresses, which address the first set of storage elements 142 (e.g., a first wordline).

The controller 106 may generate an ECC codeword representing the data and may cause the ECC codeword to be stored at the physical address or addresses that correspond to the logical address. For example, the controller 106 may cause the read/write circuitry 148 to write the ECC codeword to a storage element or storage elements corresponding to the physical address or physical addresses. The controller 106 may use the management table 110 to determine whether the logical address is a read intensive address. When the logical address is a non-read intensive address (e.g., the LBA is not associated with a read intensive address flag 112), the controller 106 may cause the read/write circuitry 148 to program the ECC codeword to the storage element or storage elements using a first set of write voltages. When the logical address is a read intensive address (e.g., the LBA is associated with a read intensive address flag 112), the controller 106 may cause the read/write circuitry 148 to program the ECC codeword to the storage element or storage elements using a second set of write voltages. The first set of write voltages may be different from the second set of write voltages. For example, the second set of write voltages may have a larger lowest write voltage (e.g., associated with the A state) than the first set of write voltages, such as illustrated with respect to the graphs 170 and 180. In another example, programming voltage pulses used to program the second set of write voltages may be more finely controlled to enable generating a narrower distribution of storage elements associated with a particular state.

Subsequently, other data may be written to the memory 104 or read from the memory 104 in response to commands from the host device 120. In a particular embodiment, the logical address analyzer 114 tracks information associated with read storage elements. For example, the logical address analyzer 114 may maintain the read count 116 associated with each logical address.

When the read count 116 for a particular logical address satisfies (e.g., is greater than or equal to) the threshold, the logical address analyzer 114 may set the read intensive address flag 112 associated with the logical address. The controller 106 may move data associated with the particular logical address to a block of data reserved for read intensive logical addresses immediately, upon receiving a subsequent write command associated with the particular logical address, when data is moved due to maintenance operations in the data storage device (e.g., during garbage collection), or according to other criteria. To illustrate, the first particular storage element 144 may be mapped to a first particular logical address, that for purposes of illustration, is initially a non-read intensive logical address. At some point in time, the read count 116 associated with the first particular logical address may be determined to satisfy the threshold, and the read intensive address flag 112 associated with the first particular logical address may be set. In this illustrative example, in a first embodiment, the controller 106 modifies the logical-to-physical address map 108 based on the read count 116 satisfying the threshold or based on setting of the read intensive address flag 112. In the first embodiment, the controller 106 also causes data stored at the first particular storage element 144 to be read from the first particular storage element 144 and to be written to the second particular storage element 154. Thus, in the first embodiment, the data associated with the first particular logical address is moved to a new physical address immediately (and the logical-to-physical address map 108 is updated) when the first particular logical address is deemed a read intensive address.

In a second embodiment, after setting the read intensive address flag 112 associated with the first particular logical address, the controller 106 awaits a subsequent write command (without moving the data). Thus, if a read command associated with the first particular logical address is received after the read intensive address flag 112 is set (and before a write command associated with the first particular logical address is received), the data is read from the first particular storage element 144 based on the logical-to-physical address map 108. However, if a write command associated with the first particular logical address is received after the read intensive address flag 112 is set, the controller 106 detects that the first particular logical address is a read intensive address (based on the read intensive address flag 112) and remaps the first particular logical address to a new physical address (e.g., to a physical address associated with the second particular storage element 154) by updating the logical-to-physical address map 108. The controller 106 then causes the data associated with the write command to be written to the new physical address. Thus, in the second embodiment, the data associated with the first particular logical address is not moved immediately to a new physical address when the first particular logical address is deemed a read intensive address.

When the host device 120 sends a read command, such as the read command 124, to the data storage device 102, the controller 106 determines a physical address mapped to a logical address indicated by the read command. The controller 106 also determines whether the logical address is a read intensive address (e.g., based on the read intensive address flags 112). The controller 106 causes the read/write circuitry 148 to read the physical address mapped to the logical address. The controller 106 causes the read/write circuitry 148 to use a first set of read voltages to read physical addresses that are associated with non-read intensive logical addresses and causes the read/write circuitry 148 to use a second set of read voltages to read physical addresses that are associated with read intensive logical addresses. The first set of read voltages are different from the second set of read voltages. For example, the second set of read voltages may have a larger lowest read voltage (e.g., associated with distinguishing the Er state and the A state) than the first set of read voltages.

The system 100 enables storage of data associated with non-read intensive logical addresses at a portion of the memory 104 that is distinct (e.g., having no shared storage elements) from a portion of the memory 104 that stores data associated with read intensive logical addresses. For example, storage elements associated with the second set of physical addresses 150 may include one or more blocks of the memory 104 that are set aside to store data associated with read intensive logical addresses. Since the physical addresses corresponding to the read intensive logical addresses are not adjacent to the physical addresses corresponding to the non-read intensive logical addresses, the frequent reads associated with the read intensive logical addresses do not significantly increase errors associated with the portion of the memory corresponding to the non-read intensive logical addresses due to read disturb effects.

Additionally, the system 100 enables use of a write operation using a first programming mode to write to the first set of physical addresses 140 and a write operation using a second programming mode to write to the second set of physical addresses 150. For example, the first programming mode may use a first set of write voltages (e.g., $V_{WA}$, $V_{WB}$, and $V_{WC}$ of the graph 170), and the second programming mode may use a second set of write voltages (e.g., $V_{WA}'$, $V_{WB}'$, and $V_{WC}'$ of the graph 180) that is different from the first set of write voltages. To illustrate, the lowest write voltage (e.g., associated with the A state) may be larger for the second set of write voltages that for the first set of write voltages. Alternatively or in addition, as compared to the first programming mode, the second programming mode may generate a smaller (e.g., narrower) distribution of voltages for storage elements in a particular state. For example, storage elements in the A state may have a narrower distribution when programmed using the second programming mode than when programmed using the first programming mode. Thus, the second programming mode may help to reduce read disturb effects associated with read intensive addresses, such as logical addresses mapped to the second set of physical addresses 150. The first write mode and the second write mode may differ in other ways in addition to or instead of the specific write voltages or programming voltage pulses used so long as a write operation performed using the second write mode reduces read disturb errors by facilitating distinguishing two or more states that would otherwise be prone to read disturb errors.

Additionally, or in the alternative, the system 100 may enable use of a read operation using a first read mode to read data from the first set of physical addresses 140 and a read operation using a second read mode to read data from the second set of physical addresses 150. For example, the first read mode may use a first set of read voltages (e.g., $V_{RA}$, $V_{RB}$, and $V_{RC}$ of the graph 170), and the second read mode may use a second set of read voltages (e.g., $V_{RA}'$, $V_{RB}'$, and $V_{RC}'$ of the graph 180) that is different from the first set of read voltages. To illustrate, the second set of read voltages may have a larger lowest read voltage (e.g., associated with distinguishing the Er state and the A state) than does the first set of read voltages. Thus, the second read mode may help to mitigate or avoid data errors when reading storage elements affected by read disturb, such as storage elements corresponding to logical addresses mapped to the second set of physical addresses 150.

Although each of the first particular storage element 144 and the second particular storage element 154 is described above as corresponding to a physical address that is mapped to a particular logical address, in some configurations, each logical address may be mapped to more than one storage element. For example, a logical address may be mapped to a number of storage elements (and physical addresses) corresponding to an ECC codeword. In this example, each write operation may write an entire ECC codeword to the memory 104, and each read operation may read an entire ECC codeword from the memory 104. In another example, more than one ECC codeword may be written or read at a time. Accordingly, when the description above refers, for example, to a particular logical address corresponding to or being mapped to the first particular storage element 144, it is understood that, in certain configurations, the particular logical address may correspond to or be mapped to a larger set of storage elements (such as the first set of storage elements 142) of which the first particular storage element 144 is a subset.

Although the first set of storage elements 142 and the second set of storage elements 152 are described above as being separate (e.g., not adjacent), in some implementations, data associated with read intensive logical addresses and data associated with non-read intensive logical addresses may be stored in adjacent storage elements (e.g., in adjacent wordlines). In these implementations, the second programming mode described above may be used to program wordlines that are adjacent to wordlines that store read intensive data. Similarly, the second read mode described above may be used to read the wordlines that are adjacent to the wordlines that store read intensive data.

Figure 2:
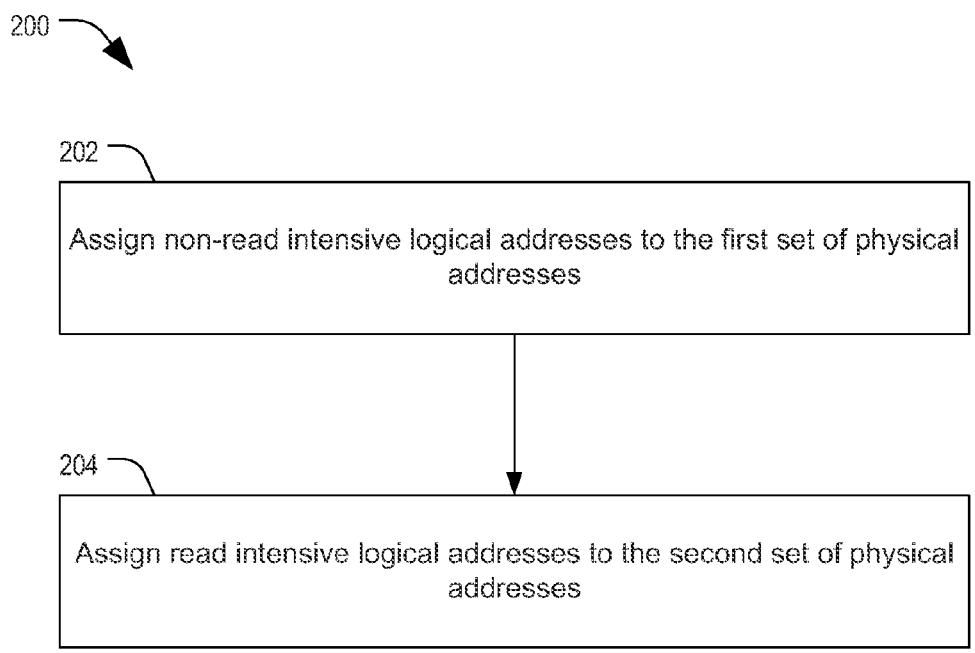
FIG. 2 is a flow diagram of a first illustrative method that may be performed by the data storage device of FIG. 1.

Referring to FIG. 2, a flow diagram of a first illustrative method 200 that may be performed by the data storage device 102 of FIG. 1 is shown. For example, the method 200 may be performed by the controller 106 of FIG. 1. The method 200 includes, at 202, assigning non-read intensive logical addresses to the first set of physical addresses, and at 204, assigning read intensive logical addresses to the second set of physical addresses. For example, the controller 106 may maintain the logical-to-physical address map 108 which maps logical addresses to physical addresses. By default, logical addresses may be mapped to the first set of physical addresses 140. Each logical address that is determined to be a read intensive logical address (e.g., based on the read count 116 or based on other information, such as information received from the host device 120 that identifies read intensive logical addresses), may be mapped to the second set of physical addresses 150. The second set of physical addresses 150 may be designated (e.g. set aside) for read intensive logical addresses. To illustrate, after a particular logical address is determined to be a read intensive logical address, the controller 106 may modify the logical-to-physical address map 108 to remap the particular logical address to a physical address of the second set of physical addresses.

Thus, the method 200 enables storage of data associated with non-read intensive logical addresses at a portion of the memory that is distinct from a portion of the memory that stores data associated with read intensive logical addresses. Since the physical addresses corresponding to the read intensive logical addresses are not adjacent to the physical addresses corresponding to the non-read intensive logical addresses, the frequent reads associated with the read intensive logical addresses do not significantly increase errors associated with storage elements corresponding to the non-read intensive logical addresses due to read disturb effects.

Figure 3:
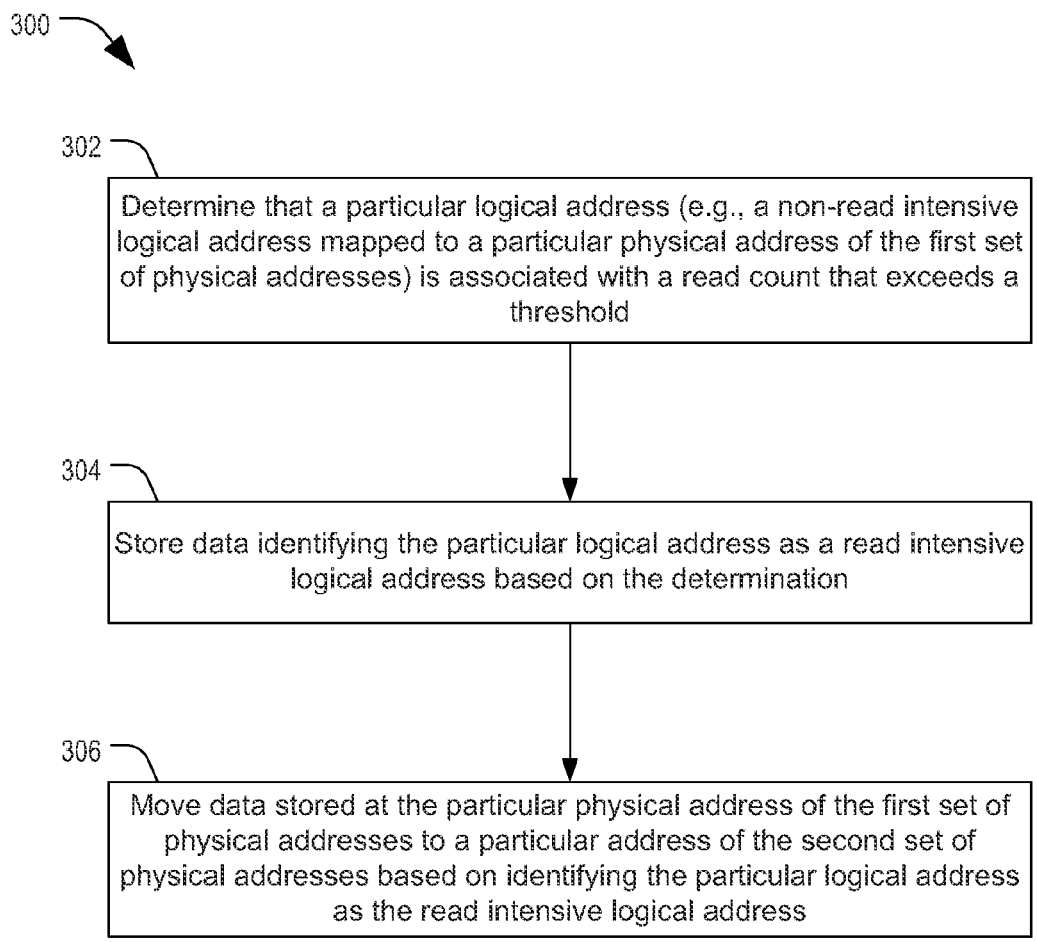
FIG. 3 is a flow diagram of a second illustrative method that may be performed by the data storage device of FIG. 1.

FIG. 3 is a flow diagram of a second illustrative method 300 that may be performed by the data storage device 102 of FIG. 1. For example, the method 300 may be performed by the controller 106 of FIG. 1.

The method 300 includes, at 302, determining that a particular logical address is associated with a read count that exceeds a threshold. For example, the particular logical address may be a non-read intensive logical address that is mapped (by the logical-to-physical address map 108) to a particular physical address of the first set of physical addresses 140 of FIG. 1. The logical address analyzer 114 may determine that the particular logical is associated with the read count 116, and that the read count 116 satisfies (e.g., is greater than or equal to) the threshold. The threshold may be used to distinguish read intensive logical addresses from non-read intensive logical addresses. To illustrate, logical addresses associated with a read count that satisfies the threshold may be deemed to be read intensive logical addresses, and logical addresses associated with a read count that does not satisfy the threshold may be deemed to be non-read intensive logical addresses.

The method 300 also includes, at 304, storing data identifying the particular logical address as a read intensive logical address based on the determination. For example, the read intensive address flag 112 of FIG. 1 may be set for the particular logical address to indicate that the particular logical address is a read intensive logical address.

The method 300 also includes, at 306, moving data stored at the particular physical address of the first set of physical addresses to a particular address of the second set of physical addresses based on identifying the particular logical address as the read intensive logical address. For example, the first set of physical addresses 140 of FIG. 1 may be used to store data associated with non-read intensive logical addresses, and the second set of physical addresses 150 may be used to store data associated with read intensive logical addresses. In this example, the data associated with the particular logical address may be moved from storage elements corresponding to a physical address of the first set of addresses 140 to storage elements corresponding to a physical address of the second set of physical addresses 150. Additionally, the logical-to-physical address map 108 may be updated to remap the particular logical address from the physical address of the first set of addresses 140 to the physical address of the second set of physical addresses 150.

Thus, the method 300 enables storage of data associated with non-read intensive logical addresses at a portion of the memory that is distinct from a portion of the memory that stores data associated with read intensive logical addresses. Since the physical addresses corresponding to the read intensive logical addresses are not adjacent to the physical addresses corresponding to the non-read intensive logical addresses, the frequent reads associated with the read intensive logical addresses do not significantly increase errors associated with the storage elements corresponding to non-read intensive logical addresses due to read disturb effects.

Figure 4:
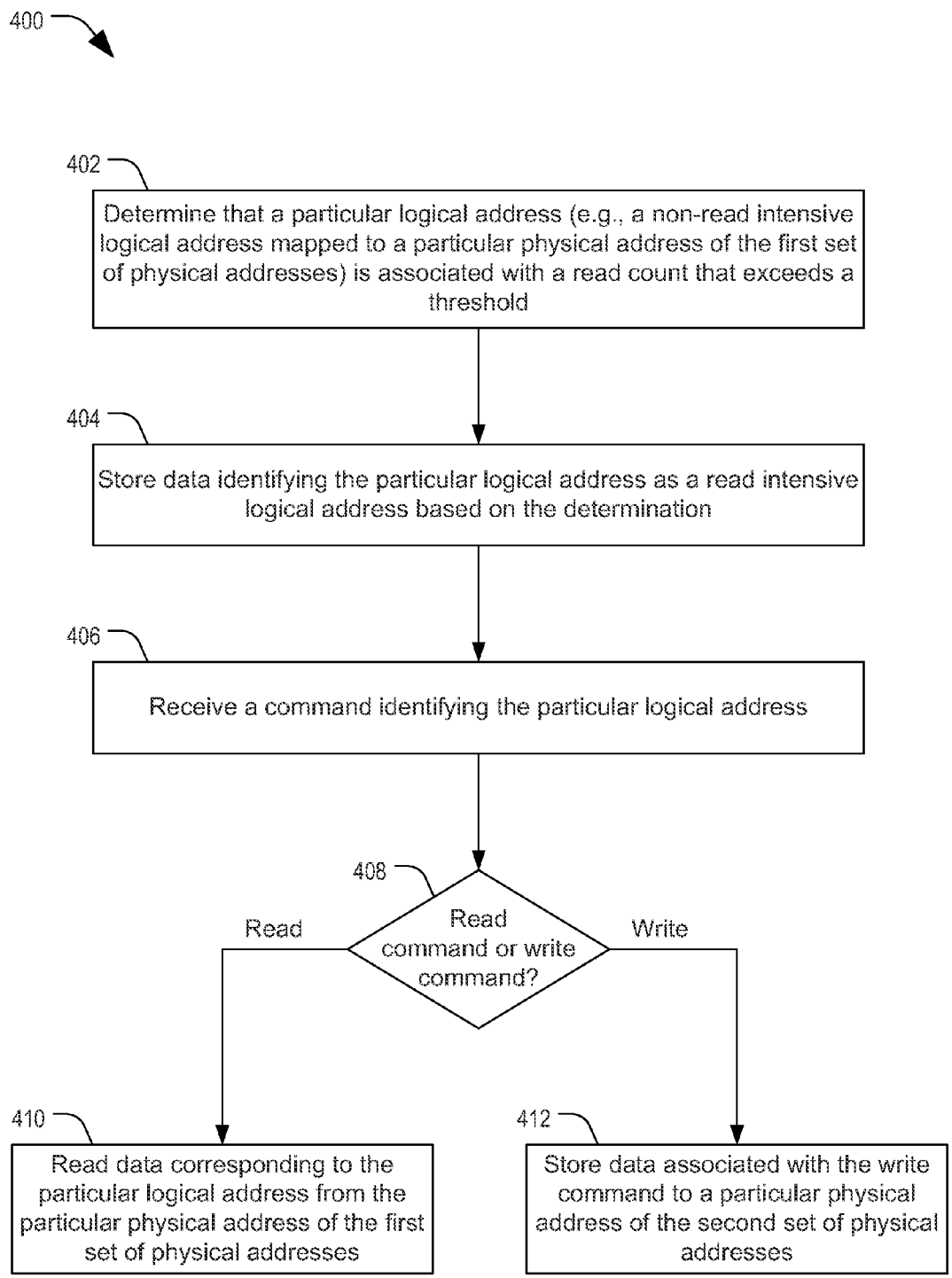
FIG. 4 is a flow diagram of a third illustrative method that may be performed by the data storage device of FIG. 1.

FIG. 4 is a flow diagram of a third illustrative method 400 that may be performed by the data storage device of FIG. 1. For example, the method 400 may be performed by the controller 106 of FIG. 1.

The method 400 includes, at 402, determining that a particular logical address is associated with a read count that exceeds a threshold. For example, the particular logical address may be a non-read intensive logical address that is mapped (by the logical-to-physical address map 108) to a particular physical address of the first set of physical addresses 140 of FIG. 1. The logical address analyzer 114 may determine that the particular logical address is associated with the read count 116, and that the read count 116 satisfies (e.g., is greater than or equal to) the threshold. The threshold may be used to distinguish read intensive logical addresses from non-read intensive logical addresses. To illustrate, logical addresses associated with a read count that satisfies the threshold may be deemed to be read intensive logical addresses, and logical addresses associated with a read count that does not satisfy the threshold may be deemed to be non-read intensive logical addresses.

The method 400 also includes, at 404, storing data identifying the particular logical address as a read intensive logical address based on the determination. For example, the read intensive address flag 112 of FIG. 1 may be set for the particular logical address to indicate that the particular logical address is a read intensive logical address.

After storing the data identifying the particular logical address as a read intensive logical address, the method 400 includes, at 406, receiving a command identifying the particular logical address. The method 400 also includes, at 408, determining whether the command is a read command or a write command. When the command is a read command, the method 400 includes, at 410, reading data corresponding to the particular logical address from the particular physical address of the first set of physical addresses. When the command is a write command, the method 400 includes, at 412, storing data associated with the write command to a particular physical address of the second set of physical addresses. Thus, in the method 400, data associated with a newly identified read intensive logical address is not moved to a new physical address. Rather, when data is received to be written to storage elements corresponding to the newly identified read intensive logical address, the received data is written to the new physical address (in a portion of the memory used to store data associated with read intensive logical addresses).

Thus, the method 400 enables storage of data associated with non-read intensive logical addresses at a portion of the memory that is distinct from a portion of the memory that stores data associated with read intensive logical addresses. Since the physical addresses corresponding to the read intensive logical addresses are not adjacent to the physical addresses corresponding to the non-read intensive logical addresses, the frequent reads associated with the read intensive logical addresses do not significantly increase errors associated with storage elements corresponding to the non-read intensive logical addresses due to read disturb effects. Additionally, no additional read or write operations are performed to copy data from storage elements used to store data associated with non-read intensive logical addresses to storage elements used to store data associated with read intensive logical addresses.

Figure 5:
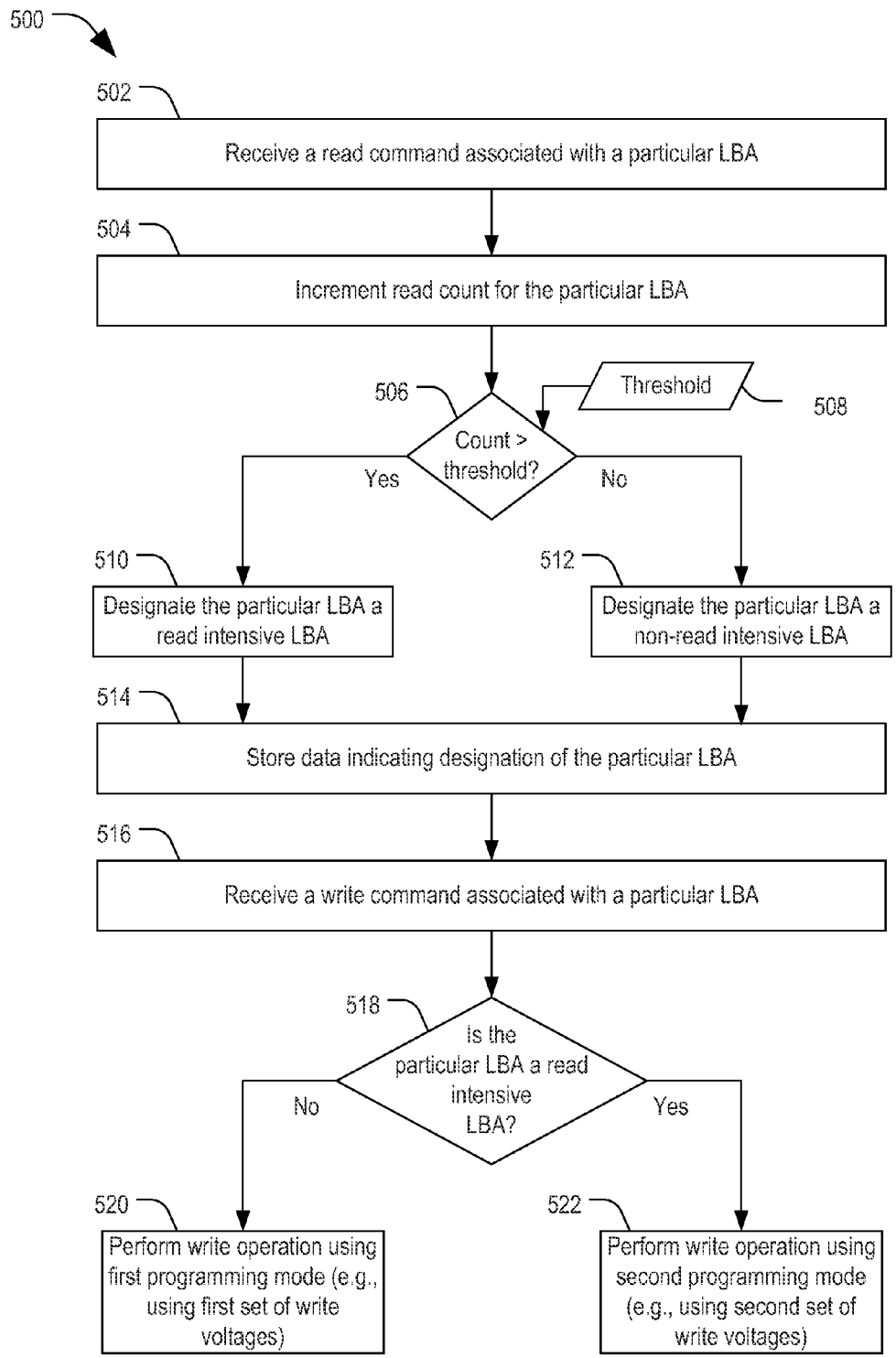
FIG. 5 is a flow diagram of a fourth illustrative method that may be performed by the data storage device of FIG. 1.

FIG. 5 is a flow diagram of a fourth illustrative method 500 that may be performed by the data storage device of FIG. 1. For example, the method 500 may be performed by the controller 106 of FIG. 1.

The method 500 includes, at 502, receiving a read command associated with a particular logical address (e.g., a particular block address (LBA)). For example, the data storage device 102 of FIG. 1 may receive the read command 124 from the host device 120. The method 500 also includes, at 504, incrementing a read count for the particular LBA. For example, the logical address analyzer 114 may increment the read count 116 for the particular LBA based on receiving the read command 124.

The method 500 also includes, at 506, determining whether the read count associated with the particular LBA exceeds a threshold 508. For example, the logical address analyzer 114 of FIG. 1 may determine whether the read count 116 associated with the particular LBA exceeds the threshold 508. The threshold 508 may be used to distinguish read intensive logical addresses from non-read intensive logical addresses.

When the read count is greater than (or greater than or equal to) the threshold 508, the method 500 includes, at 510, designating the particular LBA as a read intensive LBA. When the read count is less than the threshold 508, the method 500 includes, at 512, designating the particular LBA as a non-read intensive LBA. The method 500 may also include, at 514, storing data indicating the designation of the particular LBA. For example, when the particular LBA is designated as a read intensive LBA, the read intensive address flag 112 of FIG. 1 may be set for the particular LBA. In some configurations, when the particular LBA is designated as a non-read intensive LBA, a non-read intensive logical address flag may be set for the particular LBA. Alternatively, LBAs may be designated to be non-read intensive by default; thus, no additional data is stored to indicate that the particular LBA is a non-read intensive LBA.

The method 500 may include, after receiving the read command, receiving a write command associated with a particular LBA, at 516. For example, the data storage device 102 of FIG. 1 may receive the write command 122. After receiving the write command, the method 500 may include, at 518, determining whether the particular LBA is a read intensive LBA. For example, the controller 106 or the logical address analyzer 114 may determine whether the read intensive address flag 112 associated with the particular LBA is set.

If the particular LBA is not a read intensive LBA, the method 500 includes, at 520, performing a write operation using a first programming mode. For example, the first programming mode may use a first set of write voltages. If the particular LBA is a read intensive LBA, the method 500 includes, at 522, performing a write operation using a second programming mode. For example, the second programming mode may use a second set of write voltages that is different from the first set of write voltages. For example, the second set of write voltages may have a larger lowest write voltage (e.g., associated with distinguishing an Er state and an A state) than does the first set of write voltages. In another example, the second programming mode may more finely control programming voltage pulses to generate a narrower distribution of storage elements associated with a particular state. Thus, the method 500 enables use of different write modes to store data associated with non-read intensive logical addresses and data associated with read intensive logical addresses. A write mode used to store data at storage elements corresponding to the read intensive logical addresses may reduce errors in distinguishing certain states that may otherwise result from read disturb effects.

The method 200 of FIG. 2, the method 300 of FIG. 3, the method 400 of FIG. 4, and/or the method 500 of FIG. 5, may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, the method 200 of FIG. 2, the method 300 of FIG. 3, the method 400 of FIG. 4, and/or the method 500 of FIG. 5 can be initiated or controlled by one or more processors included in or coupled to the data storage device 102 of FIG. 1, such as one or more processors included in or coupled to the controller 106 of FIG. 1, one or more processors (or controllers) included in the host device 120 of FIG. 1, or a combination thereof.

Although various components of the data storage device 102 depicted herein are illustrated as block components and described in general terms, such components may include one or more microprocessors, state machines, or other circuits configured to enable the controller 106, the logical address analyzer 114, and/or the read/write circuitry 148 of FIG. 1 to perform operations described herein. One or more aspects of the controller 106, the logical address analyzer 114, and/or the read/write circuitry 148 may be implemented using a microprocessor or microcontroller programmed to perform operations described herein, such as one or more operations of the method 200 of FIG. 2, the method 300 of FIG. 3, the method 400 of FIG. 4, the method 500 of FIG. 5, or a combination thereof. In a particular embodiment, the controller 106 and/or the logical address analyzer 114 includes a processor executing instructions that are stored at the memory 104. Alternatively or additionally, executable instructions that are executed by the processor may be stored at a separate memory location that is not part of the memory 104, such as at a read-only memory (ROM).

The controller 106 and/or the logical address analyzer 114 of FIG. 1 may be implemented using a microprocessor or microcontroller programmed to perform the method 200 of FIG. 2, the method 300 of FIG. 3, the method 400 of FIG. 4, and/or the method 500 of FIG. 5. For example, the microprocessor or microcontroller may be configured to execute instructions (e.g., a series of instructions, such as corresponding to an algorithm) to perform certain operations described herein. For example, instructions to assign non-read intensive logical addresses to a first set of physical addresses may be performed by comparing a read count (e.g., the read count 116 of FIG. 1) associated with a particular LBA to a threshold, setting a flag (such as the read intensive address flags 112 of FIG. 1) associated with the particular LBA when the read count is greater than or equal to the threshold and refraining from setting the flag when the read count is less than the threshold, in response to determining that the flag associated with the particular LBA is not set, mapping the particular LBA to a physical address that addresses the first set of physical addresses using a logical-to-physical mapping table (such as the logical-to-physical address map 108 of FIG. 1). Additionally, instructions to assign read intensive logical addresses to a second set of physical addresses may be performed by comparing a read count (e.g., the read count 116 of FIG. 1) associated with a particular LBA to a threshold, setting a flag (such as the read intensive address flags 112 of FIG. 1) associated with the particular LBA when the read count is greater than or equal to the threshold and refraining from setting the flag when the read count is less than the threshold, in response to determining that the flag associated with the particular LBA is set, mapping the particular LBA to a physical address that addresses the second set of physical addresses using a logical-to-physical mapping table (such as the logical-to-physical address map 108 of FIG. 1).

In a particular embodiment, the controller 106 and/or the logical address analyzer 114 148 (e.g., the microprocessor or microcontroller) includes a processor executing instructions that are stored at the memory 104. Alternatively, executable instructions that are executed by the processor may be stored at a separate memory location that is not part of the memory 104, such as at a read-only memory (ROM).

In an illustrative example, the processor may execute the instructions to assign non-read intensive logical addresses to the first set of physical addresses and to assign read intensive logical addresses to the second set of physical addresses. In another illustrative example, the processor may execute the instructions to determine that a particular logical address is associated with a read count that exceeds a threshold, to store data identifying the particular logical address as a read intensive logical address based on the determination, and to move data stored at storage elements corresponding to the particular physical address of the first set of physical addresses to storage elements corresponding to a particular address of the second set of physical addresses based on identifying the particular logical address as the read intensive logical address.

In yet another illustrative example, the processor may execute the instructions to determine that a particular logical address is associated with a read count that exceeds a threshold. The processor may also execute the instructions to store data identifying the particular logical address as a read intensive logical address based on the determination, to receive a command identifying the particular logical address. When the command is a read command, the processor may execute the instructions to read data corresponding to the particular logical address from storage elements corresponding to the particular physical address of the first set of physical addresses.

When the command is a write command, the processor may execute the instructions to store data associated with the write command to storage elements corresponding to a particular physical address of the second set of physical addresses.

In a particular embodiment, the data storage device 102 may be attached to or embedded within one or more host devices, such as within a housing of a host communication device, which may correspond to the host device 120. The data storage device 102 may be within a packaged apparatus, such as a wireless telephone, a personal digital assistant (PDA), a gaming device or console, a portable navigation device, a computer device (e.g., a tablet or a laptop), or other device that uses internal non-volatile memory. However, in other embodiments, the data storage device 102 may be a portable device configured to be selectively coupled to one or more external devices, such as the host device 120. For example, the data storage device 102 may be a removable device such as a Universal Serial Bus (USB) flash drive or a removable memory card, as illustrative examples.

The host device 120 may correspond to a mobile telephone, a music player, a video player, a gaming device or console, an electronic book reader, a personal digital assistant (PDA), a computer, such as a laptop, a tablet, or a notebook computer, a portable navigation device, another electronic device, or a combination thereof. The host device 120 may communicate via a host controller, which may enable the host device 120 to communicate with the data storage device 102. The host device 120 may operate in compliance with a JEDEC Solid State Technology Association industry specification, such as an embedded MultiMedia Card (eMMC) specification, a Universal Flash Storage (UFS) Host Controller Interface specification, a Serial ATA (SATA) host interface specification, or a PCI Express (PCIe) interface standard, as illustrative, non-limiting examples. The host device 120 may operate in compliance with one or more other specifications, such as a Secure Digital (SD) Host Controller specification, as an illustrative example. Alternatively, the host device 120 may communicate with the data storage device 102 in accordance with another communication protocol.

The memory 104 may have a two-dimensional configuration, a three-dimensional (3D) configuration (e.g., a 3D memory), or any other configuration, and may include a single die or multiple dies (e.g., multiple stacked memory dies). The data storage device 102 may be configured to be coupled to the host device 120 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), a CompactFlash® (CF) card (trademark of SanDisk Corporation, Milpitas, Calif.), or a Page Perfect NAND (PPN), as illustrative, non-limiting examples. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

Semiconductor memory devices, such as the memory 104, include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations described have been presented as examples, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed. As a non-limiting example, the substrate may include silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word-lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration (e.g., in an x-z plane), thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations are possible where some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

In some implementations, the memory 104 is a non-volatile memory having a three-dimensional (3D) memory configuration that is monolithically formed in one or more physical levels of arrays of memory cells having an active area disposed above a silicon substrate. The data storage device 102 includes circuitry, such as the read/write circuitry 148 of FIG. 1, as an illustrative, non-limiting example, associated with operation of the memory cells.

Associated circuitry is typically used for operation of the memory elements and for communication with the memory elements. This associated circuitry may be on the same substrate as the memory array and/or on a separate substrate. As non-limiting examples, the memory devices may have driver circuitry and control circuitry used in the programming and reading of the memory elements.

One of skill in the art will recognize that this disclosure is not limited to the two dimensional and three dimensional structures described but also covers all relevant memory structures within the scope of the disclosure as described herein and as understood by one of skill in the art.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a memory comprising a first set of storage elements corresponding to a first set of physical addresses and a second set of storage elements corresponding to a second set of physical addresses, the first set of storage elements distinct from the second set of storage elements; and
   a controller coupled to the memory, the controller configured to map logical addresses to physical addresses of the memory, wherein the controller is configured to assign read intensive logical addresses to the second set of physical addresses and to assign non-read intensive logical addresses to the first set of physical addresses.

2. The data storage device of claim 1, wherein the read intensive logical addresses correspond to logical addresses associated with a read count that exceeds a threshold.

3. The data storage device of claim 1, wherein the controller is further configured to identify a particular logical address that is mapped to a particular physical address of the first set of physical addresses as a read intensive logical address based on a number of reads associated with the particular logical address.

4. The data storage device of claim 3, wherein the controller is further configured to remap the particular logical address, after the particular logical address is identified as a read intensive logical address, from the particular physical address of the first set of physical addresses to a second particular physical address of the second set of physical addresses.

5. The data storage device of claim 4, wherein the controller is further configured to cause data stored at a first storage element corresponding to the particular physical address of the first set of physical addresses to be read from the particular physical address of the first set of physical addresses and to be written to a second storage element corresponding to the second particular physical address of the second set of physical addresses when the particular logical address is remapped.

6. The data storage device of claim 4, wherein, after the particular logical address is remapped, the controller is configured to cause data addressed to the particular logical address to be written to a storage element corresponding to the second particular physical address of the second set of physical addresses.

7. The data storage device of claim 1, wherein the memory is a multi-level cell (MLC) memory.

8. The data storage device of claim 7, wherein the first set of storage elements is associated with a first set of write voltages and wherein the second set of storage elements is associated with a second set of write voltages.

9. The data storage device of claim 7, wherein the first set of storage elements is associated with a first set of read voltages and wherein the second set of storage elements is associated with a second set of read voltages.

10. The data storage device of claim 9, wherein a first state of a storage element of the MLC memory is distinguishable from a second state of the storage element of the MLC memory using a lowest read voltage, wherein the lowest read voltage is larger for the second set of read voltages than for the first set of read voltages.

11. The data storage device of claim 1, wherein the first set of storage elements is not adjacent to the second set of storage elements.

12. A method comprising:
    at a data storage device that includes a controller and a memory, the memory including a first set of storage elements corresponding to a first set of physical addresses and a second set of storage elements corresponding to a second set of physical addresses, the first set of storage elements distinct from the second set of storage elements, performing:
        assigning read intensive logical addresses to the second set of physical addresses; and
        assigning non-read intensive logical addresses to the first set of physical addresses.

13. The method of claim 12, further comprising storing data identifying a particular logical address as a read intensive logical address based on determining that the particular logical address is associated with a read count that exceeds a threshold.

14. The method of claim 13, wherein, before the read count exceeds the threshold, the particular logical address is a non-read intensive logical address mapped to a particular physical address of the first set of physical addresses.

15. The method of claim 14, further comprising moving data stored at a first particular storage element corresponding to the particular physical address of the first set of physical addresses to a second particular storage element corresponding to a particular address of the second set of physical addresses based on identifying the particular logical address as the read intensive logical address.

16. The method of claim 14, further comprising:
    if a read command associated with the particular logical address is received after storing the data identifying the particular logical address as the read intensive logical address and before a write command associated with the particular logical address is received, reading data corresponding to the particular logical address from a first particular storage element corresponding to the particular physical address of the first set of physical addresses; and
    if a write command associated with the particular logical address is received after storing the data identifying the particular logical address as the read intensive logical address, storing data associated with the write command to a second particular storage element corresponding to a particular physical address of the second set of physical addresses.

17. The method of claim 12, wherein the memory is a multi-level cell (MLC) memory.

18. The method of claim 17, wherein the first set of storage elements is associated with a first set of write voltages and the second set of storage elements is associated with a second set of write voltages.

19. The method of claim 17, wherein the first set of storage elements is associated with a first set of read voltages, and wherein the second set of storage elements is associated with a second set of read voltages.

20. The method of claim 19, wherein a first state and a second state of a storage element of the MLC memory are distinguishable using a lowest read voltage, and wherein the lowest read voltage is larger for the second set of read voltages than for the first set of read voltages.

* * * * *